United States Patent
Kondo et al.

(10) Patent No.: US 9,638,544 B2
(45) Date of Patent: May 2, 2017

(54) SENSOR TERMINAL AND SENSOR NETWORK SYSTEM

(71) Applicant: NIPPON TELEGRAPH AND TELEPHONE CORPORATION, Tokyo (JP)

(72) Inventors: Toshihiko Kondo, Atsugi (JP); Mitsuru Harada, Atsugi (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 159 days.

(21) Appl. No.: 14/376,086

(22) PCT Filed: Feb. 8, 2013

(86) PCT No.: PCT/JP2013/000715
§ 371 (c)(1),
(2) Date: Jul. 31, 2014

(87) PCT Pub. No.: WO2013/118515
PCT Pub. Date: Aug. 15, 2013

(65) Prior Publication Data
US 2014/0375473 A1 Dec. 25, 2014

(30) Foreign Application Priority Data
Feb. 8, 2012 (JP) ................. 2012-025223

(51) Int. Cl.
*G08B 23/00* (2006.01)
*G08C 15/06* (2006.01)
(Continued)

(52) U.S. Cl.
CPC ............. *G01D 4/002* (2013.01); *H04Q 9/00* (2013.01); *H04Q 2209/75* (2013.01); *H04Q 2209/823* (2013.01)

(58) Field of Classification Search
CPC .... G01D 4/002; H04Q 9/00; H04Q 2209/823; H04Q 2209/75
(Continued)

(56) References Cited

FOREIGN PATENT DOCUMENTS

| JP | H05-292571 A | 11/1993 |
|---|---|---|
| JP | H06-85938 A | 3/1994 |

(Continued)

OTHER PUBLICATIONS

International Search Report and Written Opinion for PCT/JP2013/000715, ISA/JP, mailed Apr. 23, 2013.
(Continued)

*Primary Examiner* — Tanmay Shah
(74) *Attorney, Agent, or Firm* — Harness, Dickey & Pierce, P.L.C.

(57) ABSTRACT

A sensor terminal which processes a sensor signal output from at least one sensor and transmits the sensor signal being processed to a center device through a network control unit and a communication line, includes a communication interface unit capable of being connected to the network control unit, a sensor input interface unit being connected to the sensor and inputting the sensor signal, and a control unit generating sensor data from the sensor signal input through the sensor input interface unit and transmitting sensor data corresponding to a request signal of the center device which is input through the communication interface unit from the network control unit or active sensor data to the center device through the network control unit from the communication interface unit.

17 Claims, 16 Drawing Sheets

(51) Int. Cl.
*G01D 4/00* (2006.01)
*H04Q 9/00* (2006.01)

(58) Field of Classification Search
USPC .......................................... 340/870.2, 870.02
See application file for complete search history.

(56) References Cited

FOREIGN PATENT DOCUMENTS

| JP | H08-139820 A | | 5/1996 |
|----|----|----|----|
| JP | H11-068996 A | | 3/1999 |
| JP | 2003-044971 A | | 2/2003 |
| JP | 2003-293961 A | | 10/2003 |
| JP | 2003293961 A | * | 10/2003 |
| JP | 2007-142932 A | | 6/2007 |
| JP | 2010-262510 A | | 11/2010 |

OTHER PUBLICATIONS

International Preliminary Report on Patentability (with annexes) for PCT/JP2013/000715, IPEA, issued May 16, 2014.
Notification of Reasons for Refusal, Japanese Patent Application No. 2013-557435, Jun. 9, 2015.
Notification of Reasons for Refusal, Japanese Patent Application No. 2013-557435, Mar. 15, 2016.

* cited by examiner

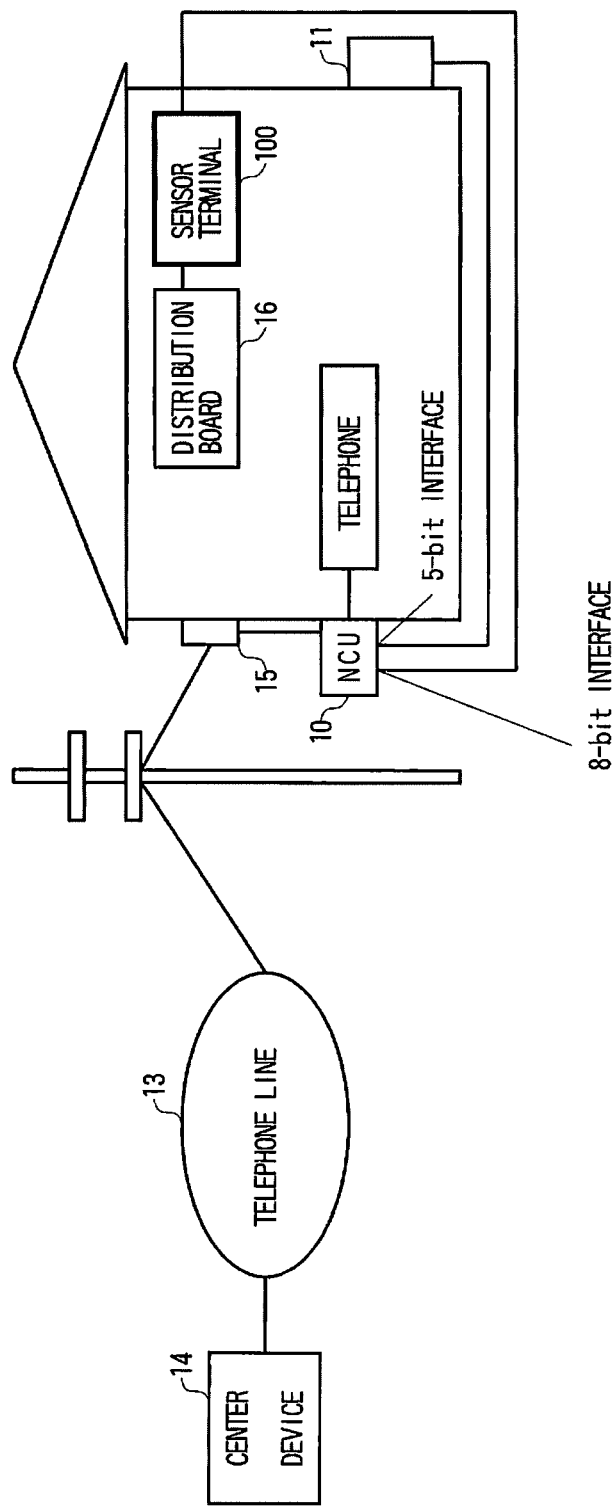
F I G. 1

FIG. 6

(1) REQUEST MESSAGE

| TERMINAL ID | COMMAND TYPE | SENSOR CHANNEL |
|---|---|---|

(2) RESPONSE MESSAGE

| TERMINAL ID | COMMAND TYPE | SENSOR CHANNEL | ACQUIRED DATA |
|---|---|---|---|

(3) SETTING MESSAGE

| TERMINAL ID | COMMAND TYPE | SENSOR CHANNEL | SETTING DATA |
|---|---|---|---|

(4) RESPONSE MESSAGE

| TERMINAL ID | COMMAND TYPE | SENSOR CHANNEL | SETTING RESULT |
|---|---|---|---|

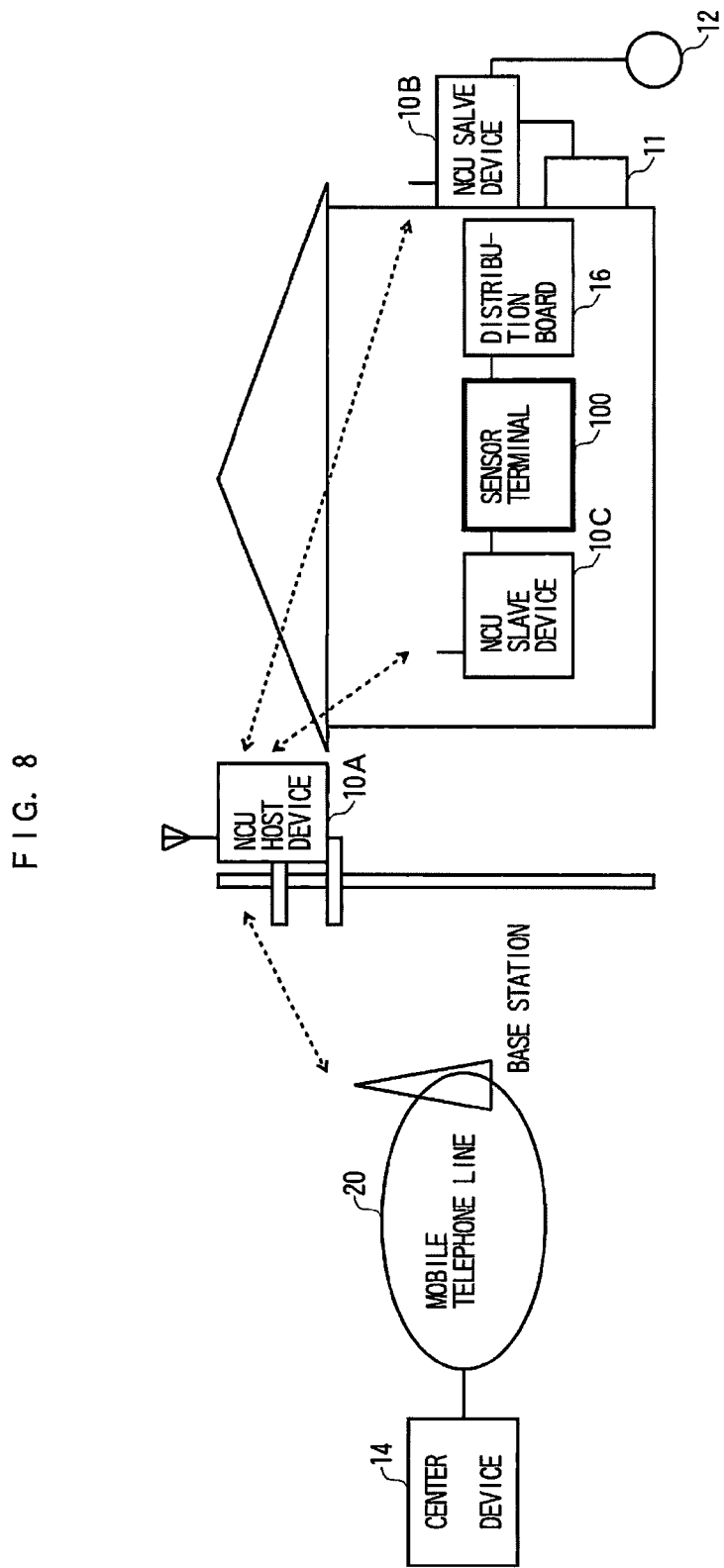
F I G. 8

F I G. 10
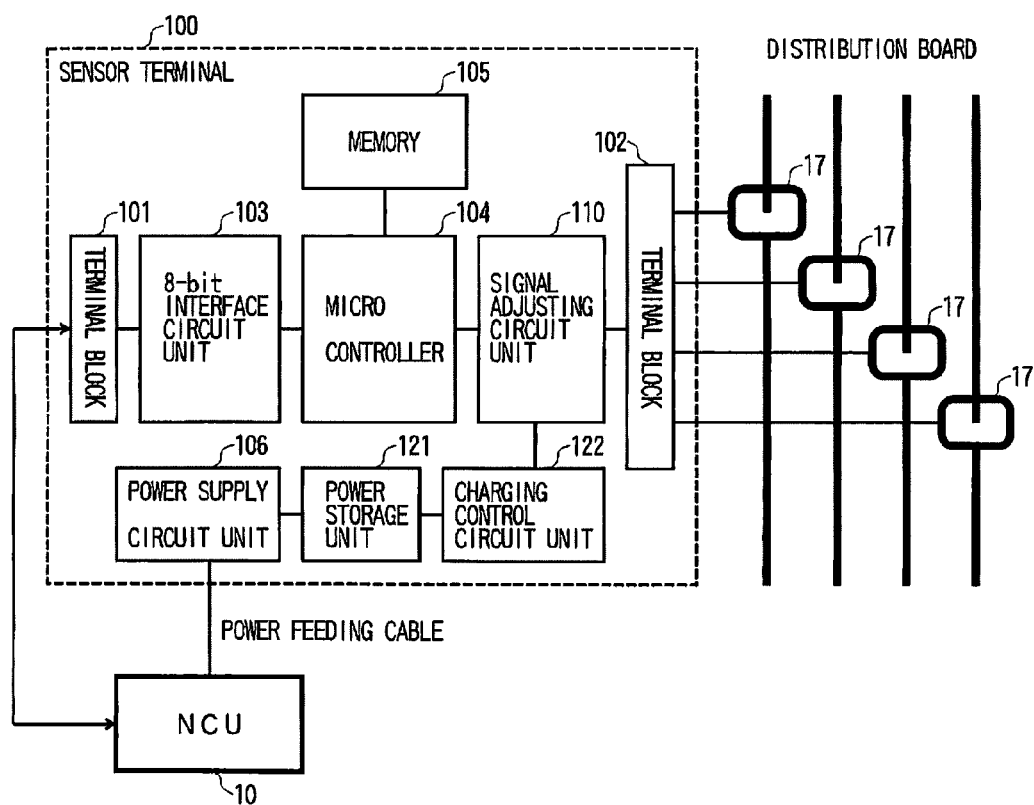

SENSOR TERMINAL AND SENSOR NETWORK SYSTEM

CROSS REFERENCE TO RELATED APPLICATIONS

This application is a U.S. National Stage application claiming the benefit of prior filed International Application Number PCT/JP2013/000715, filed on Feb. 8, 2013, in which the International Application claims priority from Japanese Patent Application Number 2012-025223, filed on Feb. 8, 2012, the entire contents of which are incorporated herein by reference.

TECHNICAL FIELD

The present application relates to a sensor terminal and a sensor network system which acquire sensor information using electric communication equipment in a remote site for monitoring and controlling.

BACKGROUND ART

A remote monitoring system is a system collecting meter-reading values such as gas, water, and electricity, and security information (such as various alarms) in a remote site from a center device and is widely spread throughout the world as one of applications of Machine to Machine communication.

FIG. 17 illustrates a configuration example of a sensor network system in the related art.

In FIG. 17, meters with a communication function such as a gas meter 11 and a water meter 12 are connected to a Network Control Unit (hereinafter, referred to as a "NCU") 10 through a 5-bit interface or an 8-bit interface which is a standard interface of the High Pressure Gas Safety Institute of Japan (KHK). The NCU 10 is connected to a center device 14 through a protector 15 and a telephone line 13, and is adapted to perform two-way communication with the center device 14. Instead of the telephone line 13, a public line such as, for example, an Integrated Services Digital Network, an Asymmetric Digital Subscriber Line, an optical line, a mobile telephone line, and a personal handy-phone system line may be used. The reason that the NCU 10 corresponds to such a wide variety of public lines is that the public lines continue to change to this day due to development of communication technology and a change in market needs, and the remote monitoring system is a system having high achievement which has been continuously used from the past.

Further, a system which is excellent in workability in a wired and wireless manner by using a local terminal network made of a host device and a plurality of the slave devices using a wireless host device and wireless slave devices is proposed (for example, see Patent Document 1).

Further, when the NCU is provided near the meter, securing a commercial power supply is difficult, and thus the NCU is likely to be driven by a battery. Since the communication frequency of the NCU is as low as several times a month, the NCU is caused to be in a sleep state except when communication is performed, and thus the same battery life as that of a test completion period of the meter may be realized.

Meanwhile, for example, in a system described in Patent Document 2, a sensor network is made using sensor terminals including various sensors of temperature, humidity, intensity of illumination, air pressure, vibration and the like which are equipped with communication functions. Sensor devices in the sensor network calculate specific indicators for realizing energy saving by analyzing a behavior pattern of a user from environmental data indicating surrounding environment and states of things, subject data indicating a condition and a behavior of a user, and energy consumption data. The sensor terminal includes devices connected to a wired network such as a LAN, and devices connected to a wireless network such as ZigBee (registered trademark), Bluetooth (registered trademark), and a specified low-power radio.

Patent Document 1: Japanese Unexamined Patent Application Publication No. H06-85938
Patent Document 2: Japanese Unexamined Patent Application Publication No. 2010-262510

DISCLOSURE

Problems To Be Solved

However, a large number of NCUs used in remote monitoring systems have already been introduced into the world, but the standard interface described above is special and industry-specific. Therefore, there are many suitable gas meters and water meters, but application to other sensor devices is rarely made.

There are some NCUs having a plurality of standard interfaces and thus a plurality of meters can be connected to one NCU. However, implementing a plurality of sensor input interfaces in addition to the meter interfaces causes a problem of an increase in size and cost of the terminal due to an increase in a circuit scale and a problem of waste of power in the interface circuit. In other words, the standard interface is configured to suppress current consumption to a microampere order other than during communication, but for example, a power meter uses an RS-485 interface, which results in great power consumption by a driver IC and the like and current consumption of a mA order or more when other than communication.

Further, in a current value measurement by the clamp-type alternating current sensors, a relatively large amount of current flows into a terminal circuit from a sensor input interface. Therefore, magnetic fields and electromagnetic waves generated around a circuit board wiring affect other wirings, and thus a correct sensor value may not be acquired.

Further, since it is assumed that the NCU is driven by a battery, when a communication frequency is increased to, for example, about once per hour due to an increase in application to a sensor device or an increase in the sensor input interface, the battery life greatly decreases, such that it requires frequent battery replacement and maintenance costs increase. Accordingly, it is difficult to adopt the NCU when monitoring the amount of use of gas, water, and electricity in real time or applications having high communication frequency, and the application is limited to a remote meter-reading by a gas meter and a water meter.

Meanwhile, since sensor terminals with a communication function and a sensing function specialized for each measurement subject are used generally in the sensor network in the related art, a terminal line-up has a tendency of high mix and low volume. Therefore, since the efficiency of production, inventory and distribution management of the sensor terminal decreases, it is disadvantageous in cost unless it is introduced into a large market in which a sufficient mass product effect is achieved. As a result, the construction of a low-cost sensor network is difficult.

A proposition of the present application is to provide a sensor terminal and a sensor network system, capable of being connected to an NCU used in an existing remote monitoring system and allowing construction of a low-cost sensor network.

Means for Solving the Problems

A sensor terminal of one embodiment which processes a sensor signal output from at least one sensor and transmits the sensor signal being processed to a center device through a network control unit and a communication line, includes a communication interface unit capable of being connected to the network control unit; a sensor input interface unit being connected to the sensor and inputting the sensor signal; and a control unit generating sensor data from the sensor signal input through the sensor input interface unit and transmitting sensor data corresponding to a request signal of the center device which is input through the communication interface unit from the network control unit or active sensor data to the center device through the network control unit from the communication interface unit.

In the sensor terminal of one embodiment, the sensor is a clamp-type alternating current sensor or a measurement device outputting a current signal as the sensor signal, and the control unit is configured to generate the sensor data by converting the current signal input from the clamp-type alternating current sensor or the measurement device into a voltage signal and sampling the voltage signal.

In the sensor terminal of one embodiment, the control unit includes a current/voltage conversion circuit unit that converts current signals input from a plurality of the sensors into voltage signals each having a predetermined input voltage range. Further, the control unit is configured to input the current signals of the plurality of the sensors while switching the current signals in sequence, and to control the current/voltage conversion circuit unit according to the sequence so as to convert the current signals into the voltage signals each having the predetermined input voltage range.

In the sensor terminal of one embodiment, the control unit includes a unit that sleeps when not detecting the current signal input from the clamp-type alternating current sensor or the measurement device and wakes up when detecting re-input of the current signal from the clamp-type alternating current sensor or the measurement device.

In the sensor terminal of one embodiment, the control unit is configured to compare the sensor data with at least one threshold and to average the sensor data by sampling the sensor data the number of sampling times depending on a size relationship with the threshold.

The sensor terminal of one embodiment includes a unit performing power feeding to each part of the sensor terminal from an AC adapter or a battery and performing power feeding to the network control unit. The control unit is configured to detect a presence or absence of the power feeding from the AC adapter at a timing of sampling the voltage signal and to perform control of switching to the power feeding from the battery based on power failure detection indicating that there is no power feeding, and is configured to further detect a feeding voltage from the battery at the timing of sampling the voltage signal so as to compare the feeding voltage with a threshold and to transmit a notification signal to the center device through the network control unit when switched to the power feeding from the battery and when the feeding voltage from the battery is below the threshold. Further, the control unit is configured to detect a presence or absence of the power feeding from the AC adapter at a timing of sampling the voltage signal and to perform control of switching to the power feeding from the battery based on power failure detection indicating that there is no power feeding, and is configured to isolate a power failure range depending on the power failure detection and a presence or absence of the voltage signal and to transmit a notification signal to the center device through the network control unit.

The sensor terminal of the one embodiment includes a unit performing power feeding from a power storage unit to each part of the sensor terminal and performing power feeding to the network control unit; and a unit charging the power storage unit using the current signal when not generating the sensor data from the current signal input from the clamp-type alternating current sensor or the measurement device.

In the sensor terminal of the first embodiment, the control unit is configured to store the sensor data generated from the sensor signal in a logical channel of a memory and to read the sensor data corresponding to the request signal of the center device from the logical channel of the memory so as to transmit the sensor data, and the request signal includes an identifier for identifying the sensor terminal and a sensor channel for specifying the logical channel.

A sensor network system of two embodiment includes the sensor terminal of one embodiment; a network control unit being connected to the sensor terminal and being connected to the center device through the communication line; and a center device performing a remote monitoring of the sensor by collecting the sensor data corresponding to the request signal transmitted to the sensor terminal through the network control unit or sensor data actively transmitted from the sensor terminal through the network control unit.

Effects

The sensor terminal of the present application can transmit the sensor data obtained by the clamp-type alternating current sensor or the general-purpose measurement device to the center device through the NCU by a wide variety of communication schemes. Further, since power can be fed from the sensor terminal of the present application to the NCU driven by the battery, it is possible to cope with an application having a high communication frequency and the applicable range of the NCU is widened.

The sensor terminal and the sensor network system of the present application can be shared with an existing NCU for remote monitoring of gas, water and the like and a remote monitoring system of gas, water and the like, and thus it is not necessary to prepare respective dedicated sensor terminals and systems. Further, since a plurality of clamp-type alternating current sensors and measurement devices can be accommodated in one sensor terminal, it is not necessary to prepare a terminal for each current sensor and the construction of a simple sensor network system can be realized at low cost.

The sensor terminal of the present application can make the center device to detect the state of a commercial power supply in an installation environment and switching to a battery by the power failure, and thus it is possible to improve the maintainability of the sensor network system.

The sensor terminal of the present application charges a current signal which is input from the sensor in the power storage unit so as to use the current signal for driving the sensor terminal, thereby enabling construction of a sensor network system that does not depend on a commercial power supply.

The sensor terminal of the present application sets a sampling condition depending on the current signal which is input from the sensor so as to average sensor data, and thus it is possible to reduce an influence of magnetic waves caused by the current signal, and thus to provide a terminal and a sensor network system having high reliability.

BRIEF DESCRIPTION OF THE DRAWINGS

FIG. 1 is a conceptual diagram illustrating an example of a sensor network system of the present application.

FIG. 6 is a diagram illustrating an example of a message format.

FIG. 8 is a conceptual diagram illustrating an example of a sensor network system in which a mobile telephone line and a specified low-power radio are combined.

FIG. 10 is a diagram illustrating a configuration example of a sensor terminal 100 of Embodiment 2.

DETAILED DESCRIPTION OF THE EMBODIMENTS

[Embodiment 1]

Figure 2:
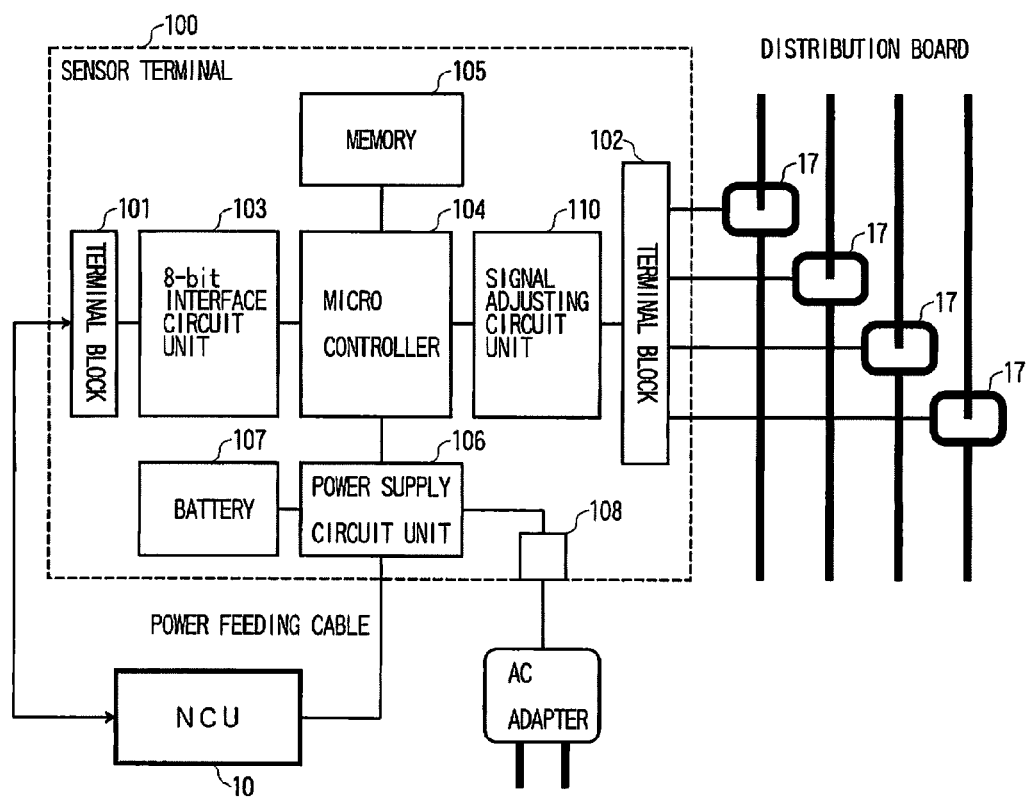
FIG. 2 is a diagram illustrating a configuration example of a sensor terminal 100 of Embodiment 1.

FIG. 1 is a conceptual diagram illustrating an example of a sensor network system of the present invention.

In FIG. 1, an NCU 10 is connected to a telephone line 13 through a protector 15. The NCU 10 has a 5-bit interface and an 8-bit interface, and a gas meter 11 with an existing communication function is connected to the 5-bit interface. Further, a sensor terminal 100 which is a feature of the present invention is connected to the 8-bit interface.

Details of the sensor terminal 100 will be described later, and, for example, the sensor terminal 100 has a terminal block capable of connecting to four systems of clam-type alternating current sensors. Current signals from the clamp-type alternating current sensors attached at four locations of secondary side power lines in a distribution board 16 are input to the terminal block. It is possible to detect power consumption of each electric apparatus, for example, by attaching the clamp-type alternating-current sensor at each breaker system. A center device 14 performs two-way communication with the NCU 10 through the telephone line 13, and transmitts a request message to the NCU 10 to collect meter-reading data from the gas meter 11 or current value data from the clamp-type alternating current sensor through the sensor terminal 100. Further, the center device 14 receives security information or power usage excess information which is transmitted in en event driven from the gas meter 11 or the sensor terminal 100. Further, the sensor terminal 100 may actively (periodically or at a predetermined setting) transmit the current value data collected from the clam-type alternating current sensor to the center device 14.

FIG. 2 illustrates a configuration example of the sensor terminal 100 in Embodiment 1.

In FIG. 2, a sensor terminal 100 includes terminal blocks 101 and 102, an 8-bit interface circuit unit 103, a micro controller 104, a memory 105, a power supply circuit unit 106, a battery 107, a DC power jack 108, and a signal adjusting circuit unit 110. The sensor terminal 100 is connected to the NCU 10 through one terminal block 101, and performs a process of transmitting and receiving data signals at a communication speed of, for example, 300 bps between the 8-bit interface circuit unit 103 and the NCU 10 which are connected to the terminal block 101. The control and the process of transmitted and received data of the 8-bit interface circuit unit 103 are performed by the micro controller 104.

Four clamp-type alternating current sensors 17 can be connected to the other terminal block 102, and the measurement of up to four locations is possible. Here, the clamp-type alternating current sensor 17 is a sensor that converts a magnetic field induced around a power line penetrated in a hole in the center of a sensor into a current signal capable of interfacing with an electronic circuit. The current signals from the clamp-type alternating current sensors 17 are input to the signal adjusting circuit unit 110 through the terminal block 102, and are converted into digital values indicating voltages by an AD converter included in the micro controller 104, after being subjected to processes of noise reduction, rectification, smoothing, current/voltage conversion circuit, signal amplification, and impedance matching. A current value is obtained by converting the digital value into a voltage value in the sensor terminal 100 or the center device 14, and dividing the voltage value by a load resistor value. Here, the signal adjusting circuit unit 110 may be provided separately for each sensor or may be provided by sharing some or all of processing functions.

Figure 3:
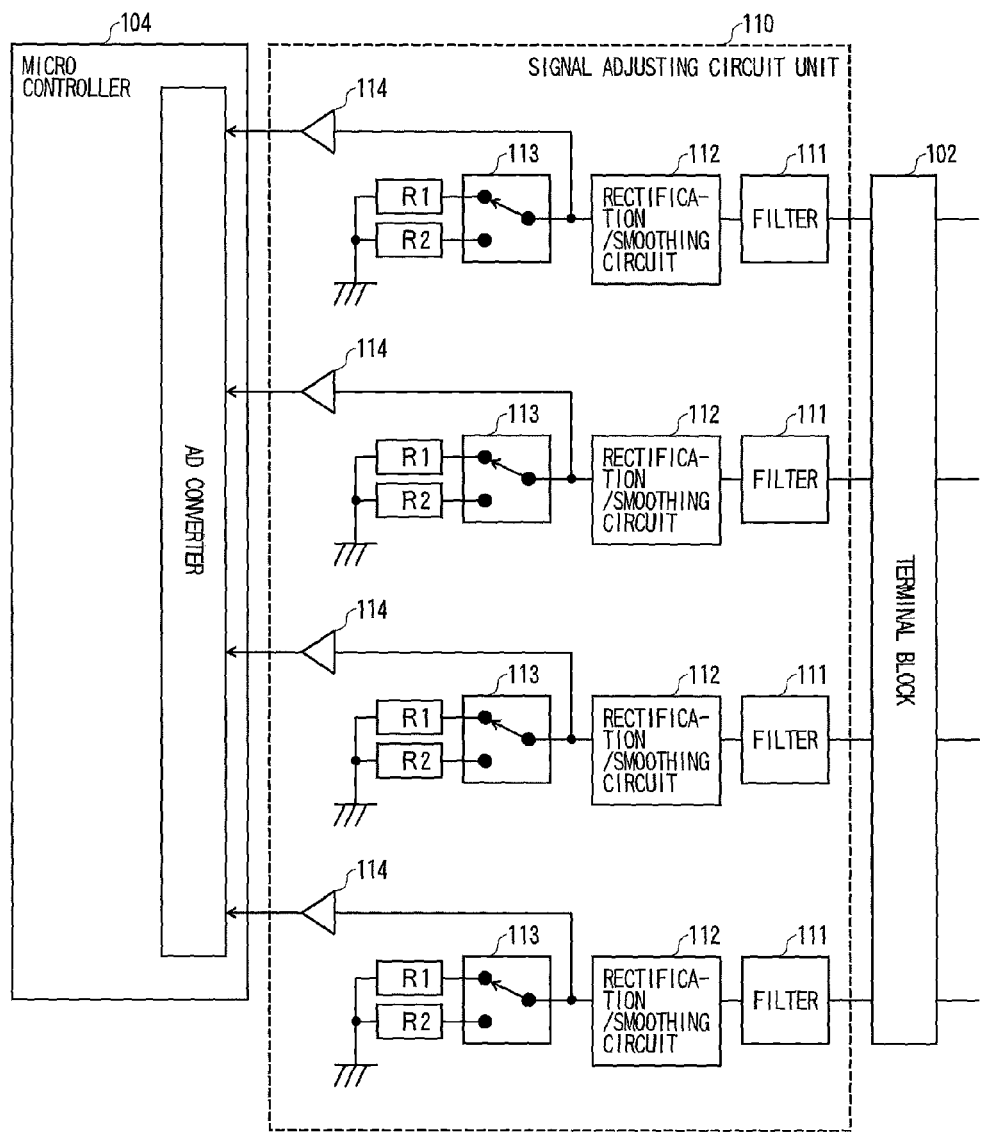
FIG. 3 is a diagram illustrating a configuration example of a signal adjusting circuit unit 110 when processing functions are provided separately in Embodiment 1.

FIG. 3 illustrates a configuration example of the signal adjusting circuit unit 110 when processing functions are provided separately in Embodiment 1.

In FIG. 3, the signal adjusting circuit unit 110 includes a filter 111, a rectification/smoothing circuit 112 including a diode bridge and an electrolytic capacitor, a selection switch 113, two types of load resistors R1 and R2, and an amplifier 114 for each input signal from each clamp-type alternating current sensor 17. First, with respect to the input signal from the clamp-type alternating current sensor 17, the high frequency components are removed by the filter 111, and a rectification by the diode bridge and a smoothing by the electrolytic capacitor of the rectification/smoothing circuit 112 is performed. Next, the input signal (current signal) is converted into a voltage signal of a desired level by the load resistors R1 and R2 selected by the selection switch 113. By selecting the load resistor, the voltage signal is adjusted to a voltage signal suitable for an input voltage range of an AD converter of the micro controller 104. As the selection switch 113 which selects the load resistors R1 and R2, an electrically switchable relay, a semiconductor switch and the like may be used in addition to a mechanical switch. Further, a configuration switchable by a pin header and a jumper socket may be used. Further, the voltage signal may be adjusted using one variable resistor instead of the selection switch 113 and the load resistors R1 and R2. Further, a gain may be adjusted in the amplifier 114 of the subsequent stage. Through the above processes, the voltage signal is input to the AD converter mounted on the micro controller 104.

Figure 4:
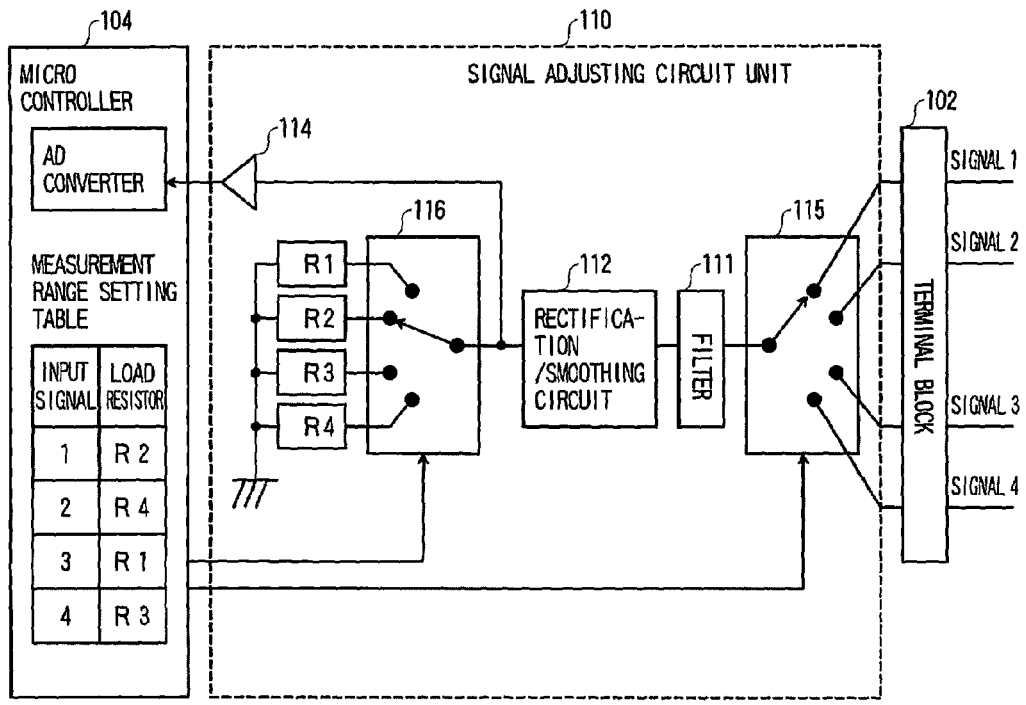
FIG. 4 is a diagram illustrating a configuration example of the signal adjusting circuit unit 110 when the processing functions are shared in Embodiment 1.

FIG. 4 illustrates a configuration example of the signal adjusting circuit unit 110 when the processing functions are shared in Embodiment 1.

In FIG. 4, the signal adjusting circuit unit 110 includes selection switches 115 and 116, the filter 111, the rectification/smoothing circuit 112 configured including a diode bridge and an electrolytic capacitor, four types of load resistors R1 to R4, and the amplifier 114. Here, a configuration is shown in which the load resistor can be selected from the four types. The micro controller 104 includes a measurement range setting table which stores a corresponding relationship between input signals 1 to 4 from respective sensors and the load resistors R1 to R4, and sets a desired path by synchronously controlling the selection switches 115 and 116 based on the corresponding relationship.

First, an operation when measuring an input signal 1 in a measurement range corresponding to the load resistor R2 will be described. The selection switch 115 is switched such that the input signal 1 is input to the filter 111. With respect to the input signal 1, the high frequency components are removed by the filter 111, and a rectification and a smoothing are performed by the rectification/smoothing circuit 112. After that, the load resistor R2 for realizing a desired range is selected by the selection switch 116 and the input signal 1 is converted into a voltage signal of the desired level. The voltage signal is amplified by the amplifier 114 and input to the AD converter mounted on the micro controller 104.

In the same manner, digital values are obtained by the AD converter repeatedly sampling the input signals 2 to 4 while the input signal is sequentially switched into 2→3→4 in the selection switch 115 based on the measurement range setting table and the desired load resistor is sequentially switched into R4→R1→R3 in the selection switch 116 in synchronization therewith. The data of the measurement range setting table may be written into the sensor terminal 100 locally using a setter, and may be written remotely by a setting message transmitted from the center device 14. The setting message is configured in a format, for example, such as a setting message shown in FIG. 6(3).

By reducing the circuit scale by the above configuration, reducing the size, power consumption and cost of the sensor terminal 100 is possible. Further, as an example described above, if the kinds of selectable load resistors are increased without increasing a mounting area, it is possible to cope with a wide variety of input signals and the applicable range is widened.

Figure 5:
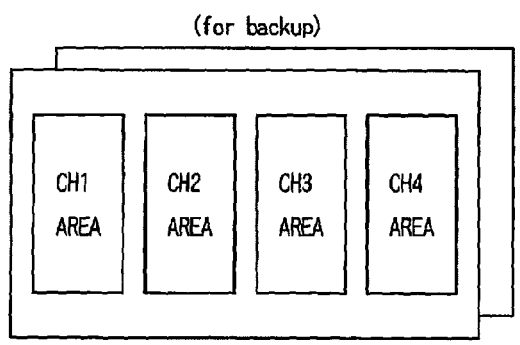
FIG. 5 is a diagram illustrating a configuration example of a memory 105.

The digital values obtained in the AD converter can be stored in the memory 105 from the micro controller 104, and is read out as necessary. As illustrated in FIG. 5, an area in the memory 105 for storing acquired data is determined in advance for each clamp-type alternating current sensor 17 and a logical channel is formed. Further, the memory 105 has a double-sided configuration for a backup during a failure, and as a result of an error check, when it is determined that there is missing data, the missing data can be restored by reading the backup data.

When reading data of a specific clamp-type alternating current sensor from the center device 14, only necessary data can be efficiently read by specifying a logical channel in the request message shown in, for example, FIG. 6(1). The request message includes a terminal ID for uniquely identifying a sensor terminal, a command type that specifies processing content of the sensor terminal, and a sensor channel for specifying the logical channel. The response message shown in FIG. 6(2) is formed by adding the acquired data to an information element of the request message shown in FIG. 6(1). Similarly, setting parameters regarding an input terminal of each sensor is performed by specifying a logical channel and setting data in a setting message shown in FIG. 6(3). A response message shown in FIG. 6(4) responds to the setting result of the setting message shown in FIG. 6(3).

A DC power jack 108 for receiving power from the AC adapter and a battery 107 are connected to the power supply circuit unit 106 shown in FIG. 2. The power supply circuit unit 106 feeds power to the 8-bit interface circuit unit 103, the micro controller 104, the memory 105, and the signal adjusting circuit unit 110. Further, the power supply circuit unit 106 includes a power supply switching unit that switches a power supply source. Further, if the power supply circuit unit 106 and the NCU 10 are connected through a power feeding cable, power can be fed from the sensor terminal 100 to the NCU 10. During power failure or when the AC adapter is not used, power is switched from the AC adapter to the battery 107, and power is fed from the battery 107 to respective units of the sensor terminal 100 and the NCU 10.

At the timing when the AD converter samples the voltage signal from the signal adjusting circuit unit 110, the micro controller 104 may inquire of the power supply circuit unit 106 whether power is fed from the AC adapter to detect a switching timing of the power from the AC adapter to the battery 107, and notify the center device 14 of an occurrence of power failure and a restoration of the power failure through the NCU 10 by the message. Further, in the same manner, at the timing when the AD converter samples the voltage signal from the signal adjusting circuit unit 110, the AD converter of the micro controller 104 acquires the output voltage of the battery 107, and when the output voltage is below than a predetermined threshold, the micro controller 104 may notify the center device 14 that little battery life is left through the NCU 10 by the message.

Further, a configuration may be possible in which the sensor terminal 100 determines the power failure status based on the detected power failure and the voltage signal from the signal adjusting circuit unit 110 and notifies the center device 14 of the determined status. In other words, when a power failure is detected and there is a voltage signal, the sensor terminal itself determines the failure of the sensor terminal 100 or a power failure of only the sensor terminal 100 by unplugging the AC adapter, and notifies the center device 14 of the failure through the NCU 10 by the message. Meanwhile, when a power failure is detected and there is no voltage signal, it is determined that a power failure occurs in all power feeding equipment in an installation environment and notifies the center device 14 of the failure through the NCU 10 by the message.

In the present embodiment, an example of using the telephone line 13 as the communication line between the NCU 10 and the center device 14 is described, but an Integrated Services Digital Network, an Asymmetric Digital Subscriber Line, an optical line, a mobile telephone line, a personal handy-phone system line, a LAN, or a wireless LAN may be used. In this case, the NCU 10 uses a line corresponding to each communication scheme. Further, a configuration in which the lines described above and the specified low-power radio are combined may be possible.

Figure 7:
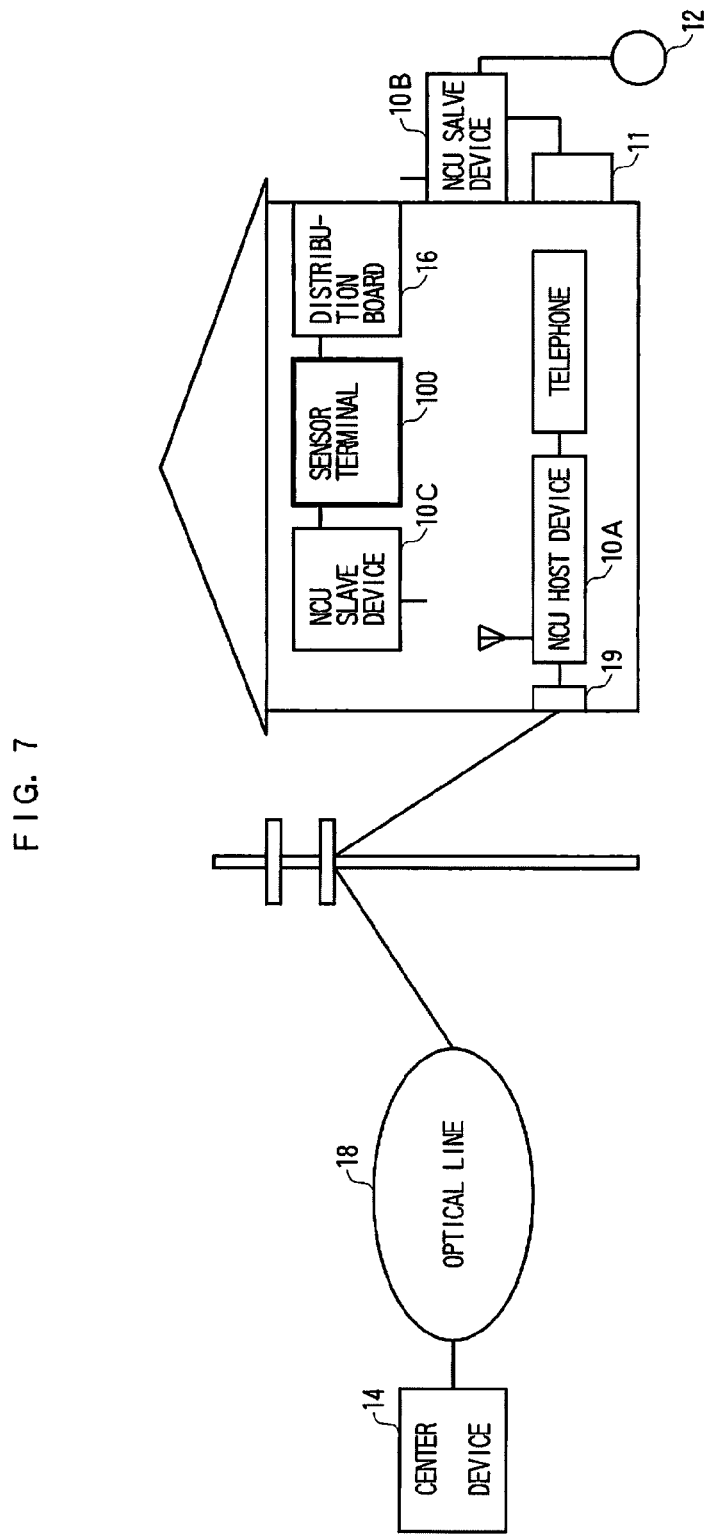
FIG. 7 is a conceptual diagram illustrating an example of a sensor network system in which an optical line and a specified low-power radio are combined.

FIG. 7 is a conceptual diagram illustrating an example of a sensor network system in which an optical line and a specified low-power radio are combined.

In FIG. 7, an NCU host device 10A is connected to an optical line 18 through a light terminating device 19, and the NCU host device 10A and the NCU slave devices 10B and 10C communicate by a specified low-power radio. The NCU slave devices 10B and 10C include a 5-bit interface and an 8-bit interface, and the gas meter 11 and the water meter 12 each having a communication function are connected to the 5-bit interface and the 8-bit interface of the NCU slave device 10B. Further, the sensor terminal 100 is connected to the 8-bit interface of the NCU slave device 10C. The detailed configuration of the sensor terminal 100 is the same as that described above.

FIG. 8 is a conceptual diagram illustrating an example of a sensor network system in which a mobile telephone line and a specified low-power radio are combined.

In FIG. 8, an NCU host device 10A of the outside of a user's home is connected to a base station of a mobile telephone line 20 and the NCU host device 10A and the NCU slave devices 10B and 10C of the inside of the user's home communicate by the specified low-power radio. The gas meter 11 and the water meter 12 each having a communication function are connected to the 5-bit interface and the 8-bit interface of the NCU slave device 10B. Further, the sensor terminal 100 is connected to the 8-bit interface of the NCU slave device 10C. The detailed configuration of the sensor terminal 100 is the same as that described above.

In the configuration illustrated in FIGS. 7 and 8, it is possible to easily accommodate the distribution board 16 on the inside, the gas meter 11 and the water meter 12 on the outside, and the like without wiring work between the inside and the outside, by respectively placing NCU slave devices 10B and 10C on the inside and the outside.

Further, in the present embodiment, a case is described in which the 8-bit interface is adopted as a communication interface to which the NCU 10 and the sensor terminal 100 are capable of being connected, but as long as the NCU 10 and the sensor terminal 100 can be connected, other interfaces are possible. Further, the NCU 10 may have a configuration in which a plurality of the same communication interfaces are equipped and a configuration in which both the 8-bit interface and other interfaces are equipped.

Figure 9:
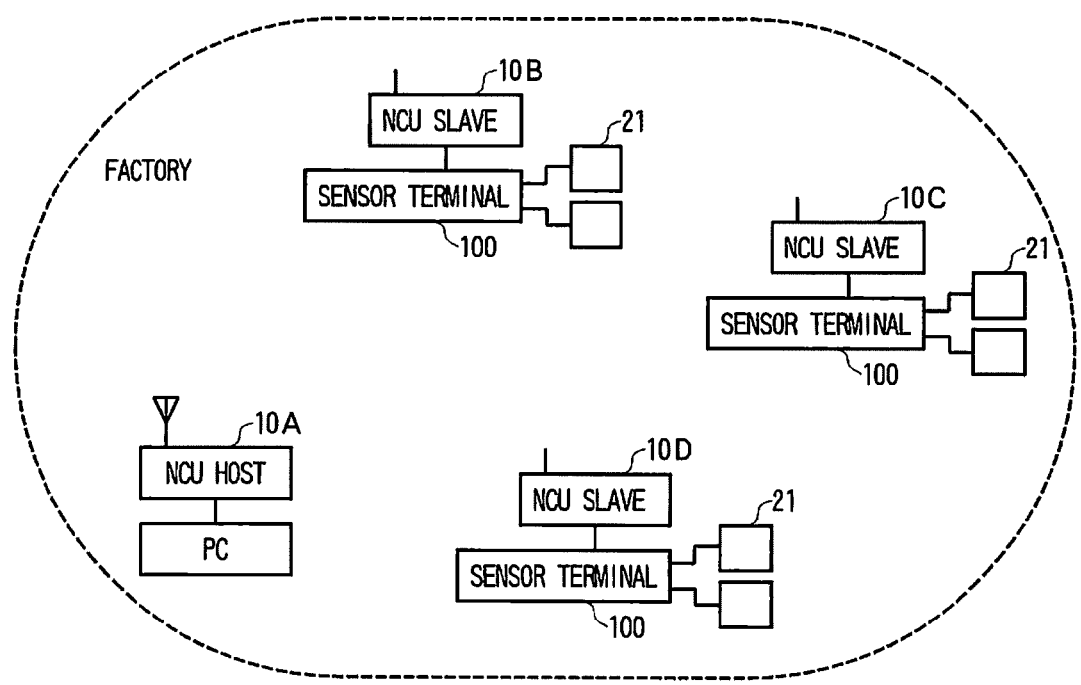
FIG. 9 is a conceptual diagram illustrating an example of a sensor network system which accommodates a general-purpose measurement device.

Further, in the present embodiment, the input signal to the sensor terminal 100 is assumed as a current signal from the clamp-type alternating current sensor 17, but may be a current signal from a general-purpose measurement device. For example, as illustrated in FIG. 9, a configuration may be possible in which current signals from a general-purpose measurement device 21 installed in a factory are collected in the sensor terminal 100 and transmitted to the NCU host device 10A through the NCU slave devices 10B to 10D. The general-purpose measurement device 21 is, for example, a temperature and humidity sensor, a pressure sensor, an inclination sensor, a $CO_2$ sensor, and the like. It is desirable that the sensors output the same instrumentation standard signal of DC 4 to 20 mA. The detailed configuration of the sensor terminal 100 is the same as that described above, and the input signal is converted into a voltage in the load resistor of the signal adjusting circuit unit 110. In addition, a local system configuration using a LAN rather than a public line is used here.

[Embodiment 2]

FIG. 10 illustrates a configuration example of a sensor terminal 100 in Embodiment 2.

In FIG. 10, the sensor terminal 100 includes terminal blocks 101 and 102, an 8-bit interface circuit unit 103, a micro controller 104, a memory 105, a power supply circuit unit 106, a signal adjusting circuit unit 110, a power storage unit 121, and a charging control circuit unit 122. Respective units other than the power storage unit 121 and the charging control circuit unit 122 are the same as those in the sensor terminal 100 in Embodiment 1. The charging control circuit unit 122 is connected to the power storage unit 121 and the signal adjusting circuit unit 110, and a part of a current which is input from the clamp-type alternating current sensor 17 to the signal adjusting circuit unit 110 is accumulated in the power storage unit 121.

Figure 11:
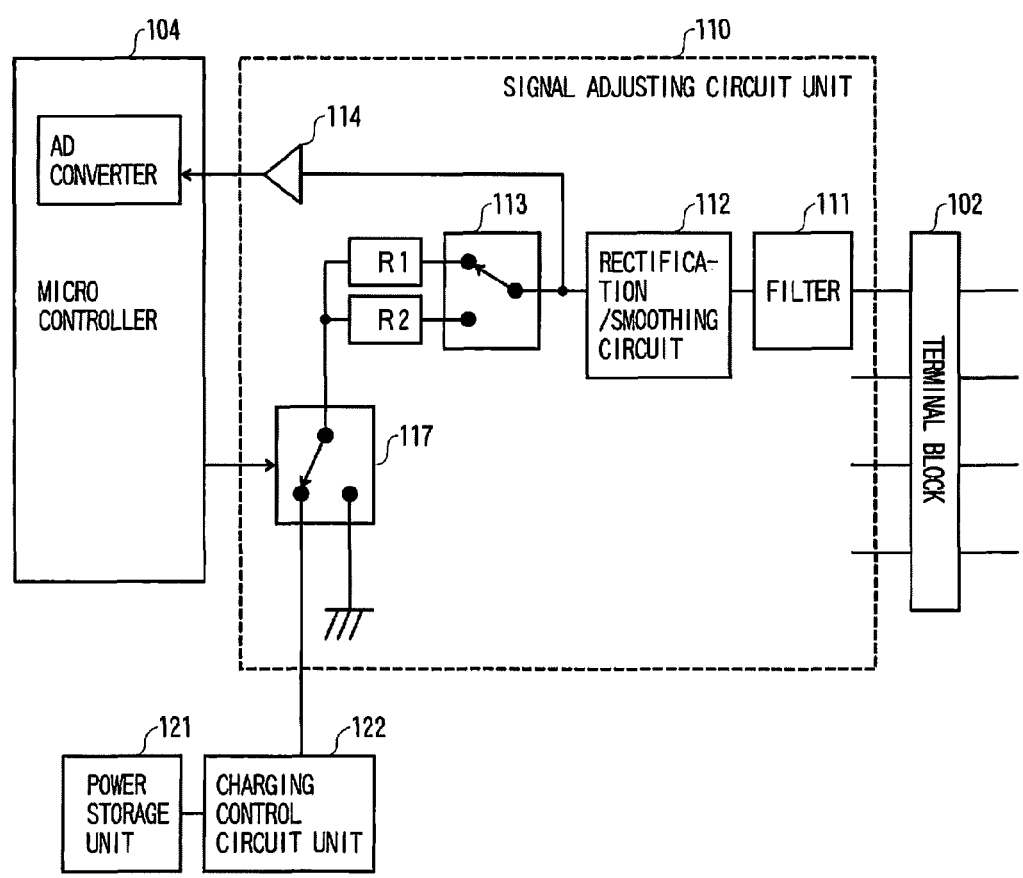
FIG. 11 is a diagram illustrating a configuration example of a signal adjusting circuit unit 110 of Embodiment 2.
Figure 12:
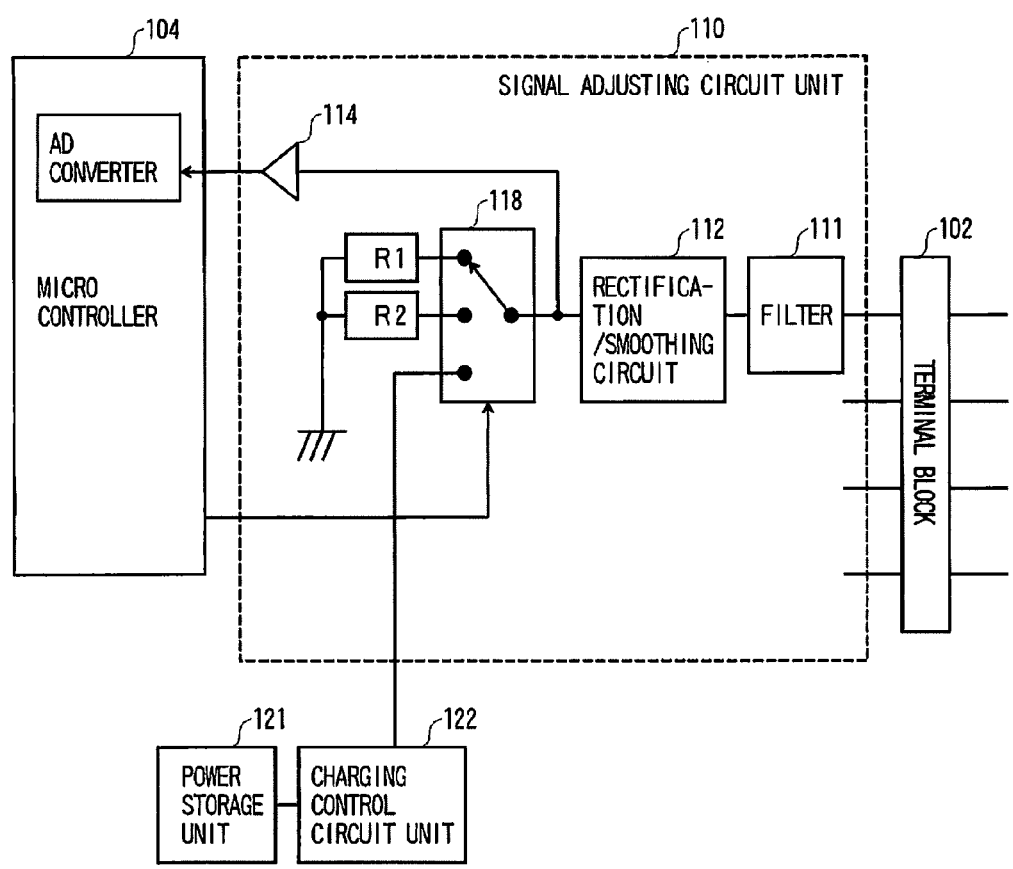
FIG. 12 is a diagram illustrating a configuration example of the signal adjusting circuit unit 110 of Embodiment 2.

FIGS. 11 and 12 illustrate a configuration example of the signal adjusting circuit unit 110 in Embodiment 2.

In FIG. 11, the signal adjusting circuit unit 110 includes a selection switch 117 of switching one end of the two types of load resistors R1 and R2 of the signal adjusting circuit unit 110 of Embodiment 1 illustrated in FIG. 3 into a ground or the charging control circuit unit 122.

In some cases, a current of a few tens of mA to about a few hundred mA flows to the load resistors R1 and R2. Therefore, when the AD converter does not sample a voltage value, the micro controller 104 controls the selection switch 117 so as to induce the current flowing through the load resistors R1 and R2 to the charging control circuit unit 122. After the charging control circuit unit 122 converts the current into a voltage or a current suitable for charging depending on the type of the power storage unit 121, the charging control circuit unit 122 supplies the converted voltage or current to charge the power storage unit 121. Here, the power storage unit 121 is a secondary battery or a capacitor. When the voltage value is sampled, the selection switch 117 is connected to a ground side and is caused to operate according to a procedure described in Embodiment 1.

The configuration example illustrated in FIG. 11 is a configuration in which the current is induced from the load resistors R1 and R2 to the charging control circuit unit 122. In contrast, as the configuration illustrated in FIG. 12, a configuration may be possible in which a current is directly induced to the charging control circuit unit 122 without passing through the load resistors R1 and R2 using a selection switch 118 of switching the load resistors R1 and R2 and the charging control circuit unit 122.

Further, only when the voltage value sampled by the AD converter exceeds a predetermined threshold, the micro controller 104 may control the selection switches 117 and 118 so as to induce a current to the charging control circuit unit 122.

[Embodiment 3]

Figure 13:
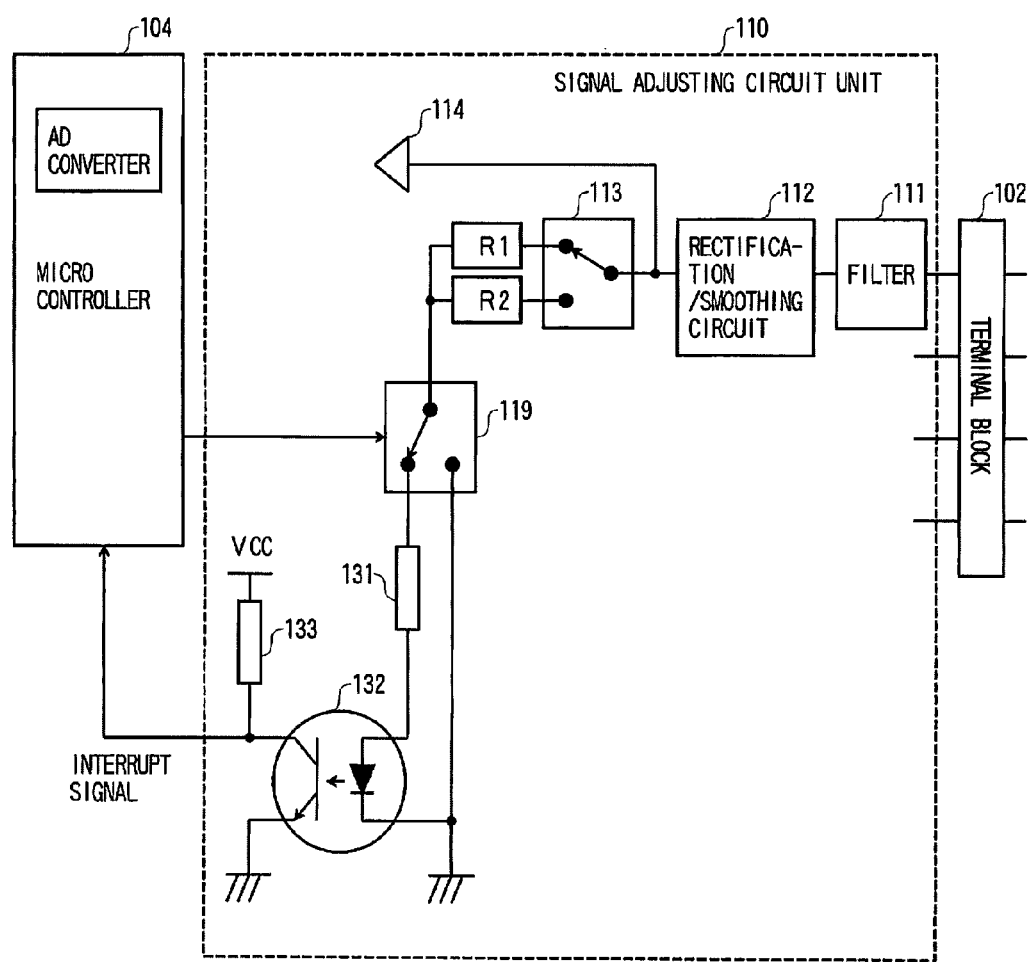
FIG. 13 is a diagram illustrating a configuration example of a signal adjusting circuit unit 110 of Embodiment 3.
Figure 14:
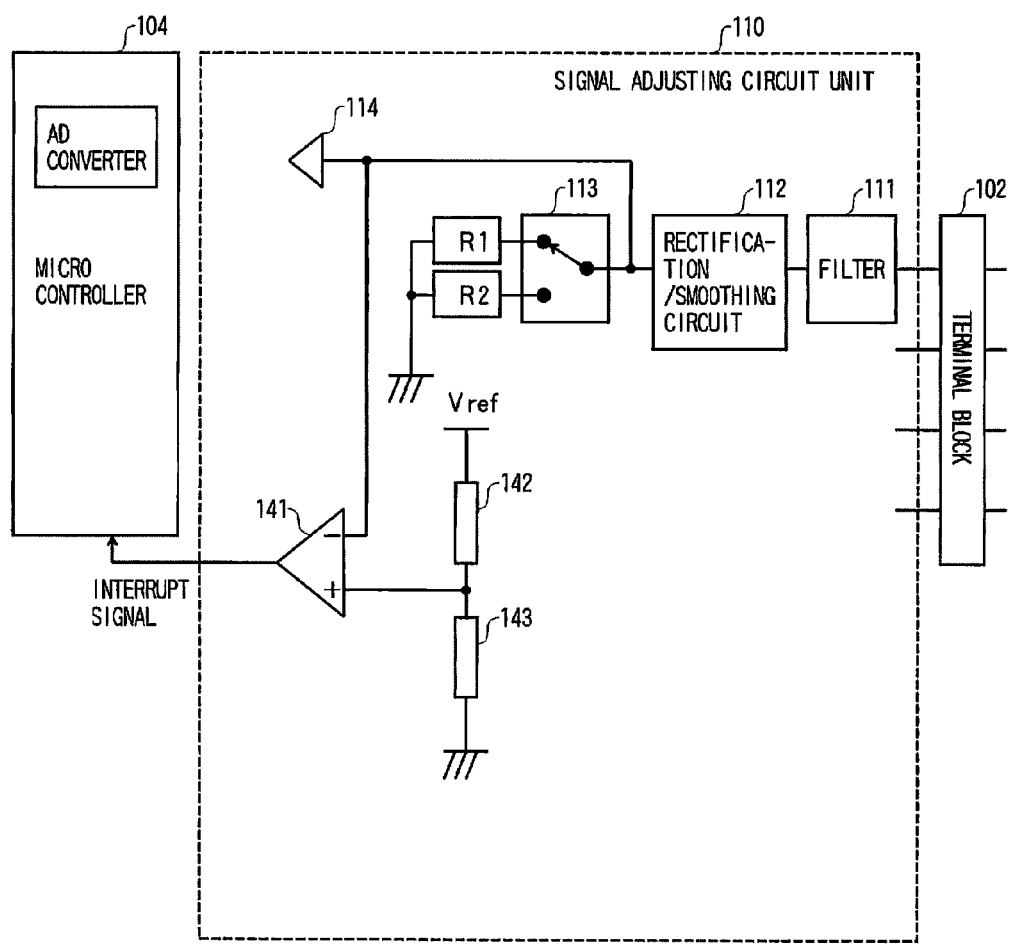
FIG. 14 is a diagram illustrating a configuration example of the signal adjusting circuit unit 110 of Embodiment 3.

FIGS. 13 and 14 illustrate a configuration example of the signal adjusting circuit unit 110 in Embodiment 3. Here, a function of causing the micro controller 104 to be in a sleep state when detecting that a current signal is not input from the clamp-type alternating current sensor 17, and of causing the micro controller 104 to wake up when detecting that the current signal is re-input from the clamp-type alternating current sensor 17 will be described.

In FIG. 13, the signal adjusting circuit unit 110 includes a selection switch 119 of switching one end of the two types of load resistors R1 and R2 of the signal adjusting circuit unit 110 of Embodiment 1 illustrated in FIG. 3 into a ground or a photo coupler 132 through the current limiting resistor 131.

When a current signal is not input from the clamp-type alternating current sensor 17 and a voltage value is not detected, the micro controller 104 controls the selection switch 119 so as to connect one end of the load resistors R1 and R2 to the photo coupler 132 through the current limiting resistor 131 and the micro controller 104 is in a sleep state. The output (interrupt signal) of the photo coupler 132 is connected to a power supply VCC through the pull-up resistor 133, and the output becomes a high level when the photo coupler 132 is in an off-state, and becomes a low level when the photo coupler 132 is in an on-state.

When a current signal is not input from the clamp-type alternating current sensor 17, a current does not flow such that the photo coupler 132 is turned off, the interrupt signal which is output from the photo coupler 132 to the micro controller 104 is fixed to a high level and the micro controller 104 continues to be in a sleep state.

When a current signal is input from the clamp-type alternating current sensor 17, a current flows through the selection switch 119 and the current limiting resistor 131 such that the photo coupler 132 is turned on, and the interrupt signal to be output becomes a low level. The micro controller 104 is triggered by the change of the interrupt signal from the high level to the low level to wake up and controls the selection switch 119 so as to switch the connecting destination of the load resistors R1 and R2 from the photo coupler 132 to the ground. Thus, the same circuit as that of Embodiment 1 is formed, and thus the micro controller 104 acquires a digital value according to the same procedure.

Further, as illustrated in FIG. 14, a configuration may be possible in which the comparator 141 detects a voltage input to the amplifier 114 and the output of the comparator 141 is input to the micro controller 104 as an interrupt signal. The comparator 141 is configured to receive a voltage to be input to the amplifier 114 and a threshold voltage adjusted by dividing a reference voltage Vref by resistors 142 and 143, and other configurations are the same as those of Embodiment 1.

When a current signal is not input from the clamp-type alternating current sensor 17, the input voltage of the amplifier 114 does not exceed the threshold voltage, and thus the interrupt signal which is output from the comparator 141 becomes a high level and the micro controller 104 is in a sleep state.

When a current signal is input from the clamp-type alternating current sensors 17 and a current flows in the load resistors R1 and R2, the input voltage of the amplifier 114 becomes high. If the voltage exceeds the threshold voltage, the interrupt signal which is output from the comparator 141 becomes a low level. The micro controller 104 is triggered by the change of the interrupt signal from the high level to the low level to wake up, and acquires a digital value according to the same procedure as in Embodiment 1.

[Embodiment 4]

In the sensor terminals 100 of Embodiment 1 to Embodiment 3, after the current signal from the clamp-type alternating current sensor 17 is subjected to processes such as a noise reduction, a rectification, a smoothing, a current/voltage conversion circuit, a signal amplification, and an impedance matching in the signal adjusting circuit unit 110, the input voltage value is converted into a digital value by the AD converter equipped in the micro controller 104. At this time, although the AD converter samples the digital value a plurality of times and performs an averaging process in order to suppress the influence of noise, the micro controller 104 performs control of changing the number of the samplings depending on an absolute value of the acquired digital value.

Figure 15:
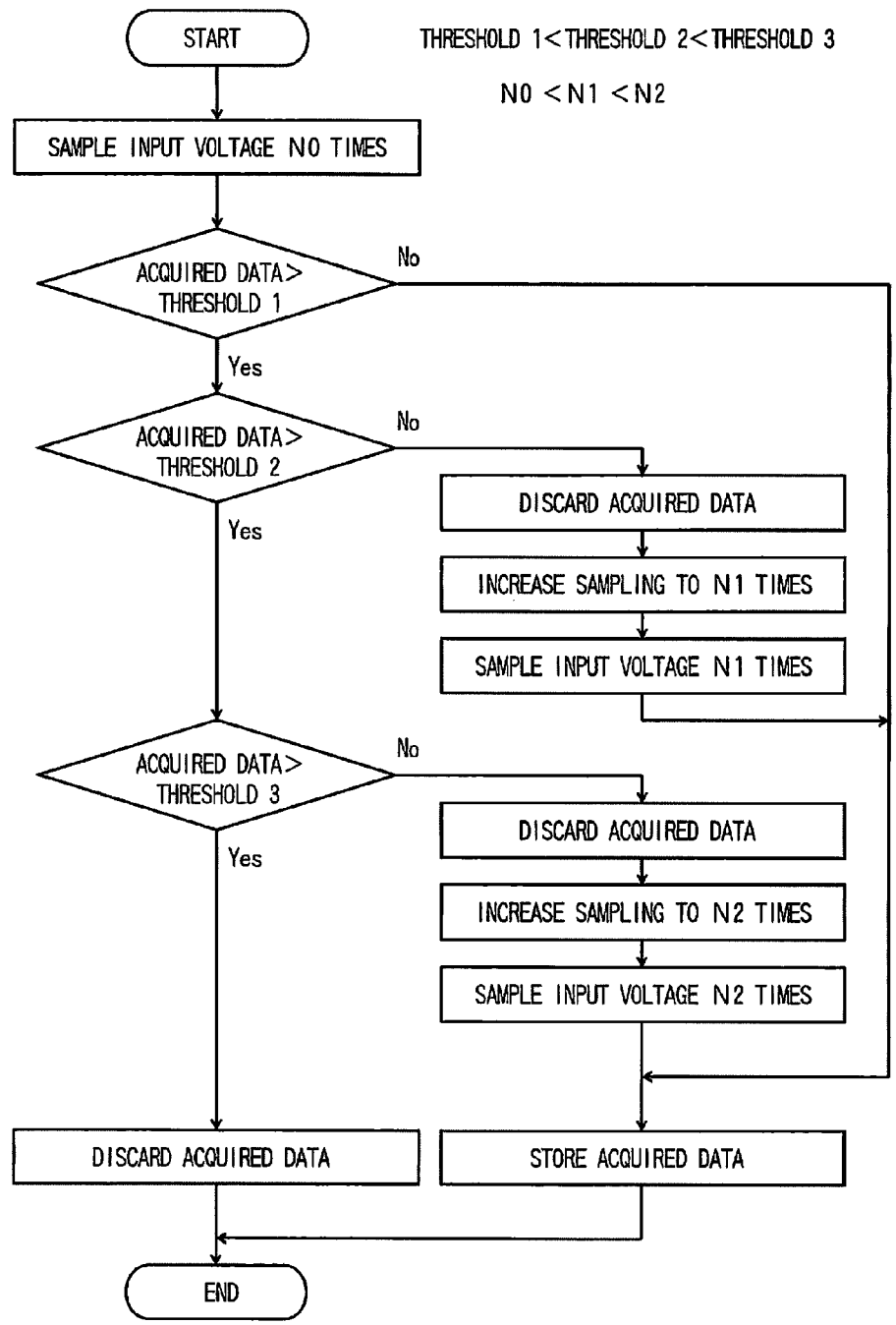
FIG. 15 is a flowchart illustrating a processing procedure example of a micro controller 104 of Embodiment 4.

FIG. 15 illustrates a processing procedure of the micro controller 104 in Embodiment 4.

Here, it is assumed that a threshold 1<a threshold 2<a threshold 3 and N0<N1<N2. First, the AD converter samples an input voltage value N0 number of times which is the number of times of an initial sampling, and the acquired digital value (acquired data) is compared with a pre-defined threshold 1. If the acquired data does not exceed the threshold 1, the acquired data is stored in the memory as it is, and if the acquired data exceeds the threshold 1, the acquired data is compared with the threshold 2. If the acquired data does not exceed the threshold 2, the acquired data is discarded by the N0 number of times of sampling, the voltage value is sampled again while the number of samplings is increased to N1, and the acquired data is stored in the memory. If the acquired data exceeds the threshold 2 by the N0 number of times of sampling, the acquired data is compared with the threshold 3. If the acquired data does not exceed the threshold 3, the acquired data is discarded by the N0 number of times of sampling, the voltage value is sampled again while the number of samplings is increased to N2, and the acquired data is stored in the memory. If the acquired data exceeds the threshold 3 by the N0 number of times of sampling, the acquired data is discarded.

In other words, if data acquired by the N0 number of times of sampling is equal to or less than the minimum threshold 1, the acquired data is adopted. If data acquired by the N0 number of times of sampling is equal to or greater than the threshold 1 and is equal to or less than the threshold 2, the data acquired by the N1 number of times of sampling more than the N0 number of times is adopted. If data acquired by the N0 number of times of sampling exceeds the threshold 2 and is equal to or less than the threshold 3, the data acquired by the N2 number of times of sampling more than N1 number of times is adopted. Then, if the data acquired by the N0 number of times of sampling exceeds the maximum threshold 3, the acquired data is discarded.

Figure 16:
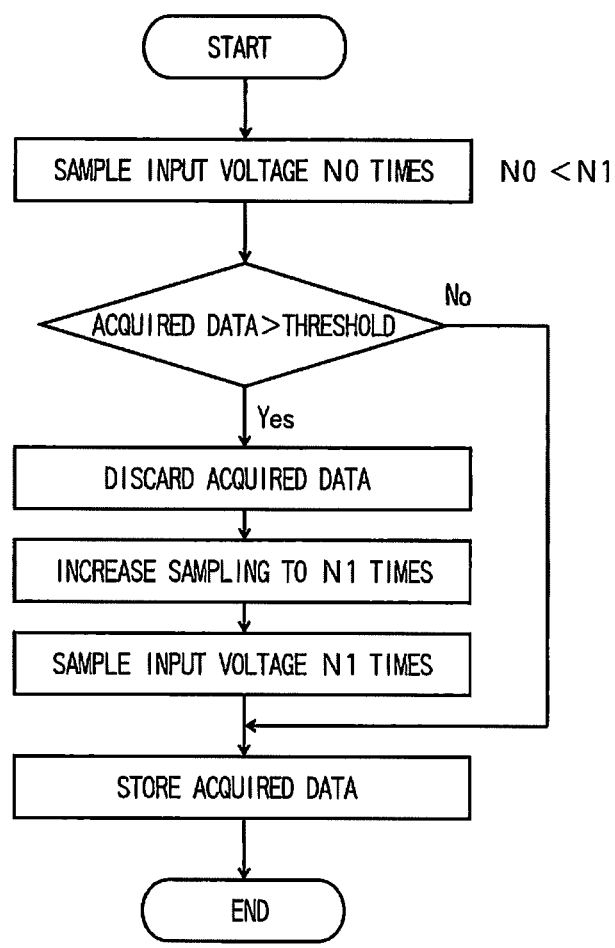
FIG. 16 is a flowchart illustrating a processing procedure example of the micro controller 104 of Embodiment 4.
Figure 17:
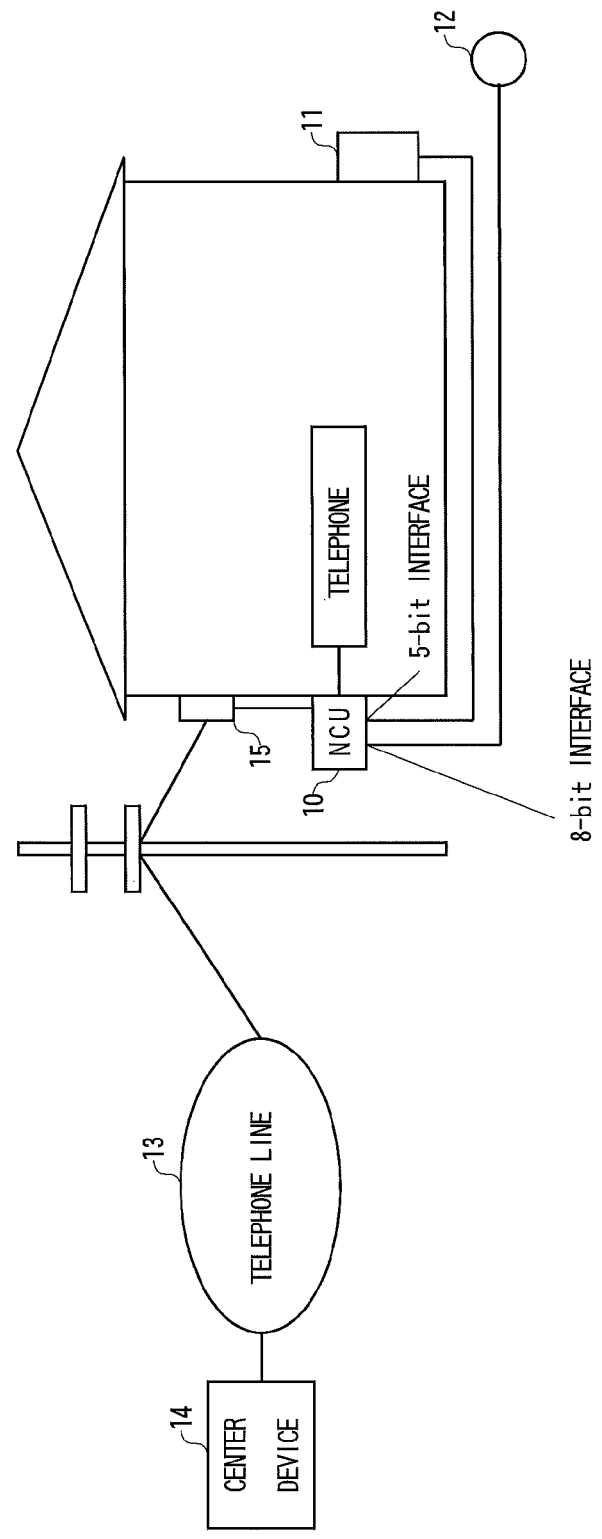
FIG. 17 is a diagram illustrating a configuration example of a sensor network system in the related art.

When performing control more specifically, the number of thresholds may be increased. Further, the number of thresholds may be one. The processing procedure when the number of thresholds is one, as illustrated in FIG. 16, is that the AD converter samples an input voltage value N0 number of times which is the number of times of an initial sampling, and the acquired digital value (acquired data) is compared with a pre-defined threshold. If the acquired data does not exceed the threshold, the acquired data is stored in the memory as it is, and if the acquired data exceeds the threshold, the data acquired by the N0 number of times of sampling is discarded, the voltage value is sampled again while the number of samplings is increased to N1, and the acquired data is stored in the memory.

Thus, it is possible to realize a sensor terminal and a sensor network system which can reduce an influence of electromagnetic waves generated by input signals and have high reliability, by setting an optimum sampling condition of an AD converter depending on the input signals from the sensor.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A sensor terminal which processes a sensor signal output from at least one sensor and transmits the sensor signal being processed to a center device through a network control unit and a communication line, comprising:
   a communication interface unit capable of being connected to the network control unit;
   a sensor input interface unit being connected to the sensor and inputting the sensor signal; and
   a control unit generating sensor data from the sensor signal input through the sensor input interface unit and transmitting sensor data corresponding to a request signal of the center device and active sensor data to the center device through the network control unit from the communication interface unit, in which the request signal of the center device is input through the communication interface unit from the network control unit,
   wherein the control unit includes a current/voltage conversion circuit unit that converts current signals input from a plurality of sensors into voltage signals each having a predetermined input voltage range, and
   wherein the control unit is configured to input the current signals of the plurality of sensors while switching the current signals in sequence and to control the current/voltage conversion circuit unit according to the sequence so as to convert the current signals into the voltage signals each having the predetermined input voltage range.

2. A sensor terminal which processes a sensor signal output from at least one sensor and transmits the sensor signal being processed to a center device through a network control unit and a communication line, comprising:
   a communication interface unit capable of being connected to the network control Unit;
   a sensor input interface unit being connected to the sensor and inputting the sensor signal; and
   a control unit generating sensor data from the sensor signal input through the sensor input interface unit and transmitting sensor data corresponding to a request signal of the center device and active sensor data to the center device through the network control unit from the communication interface unit, in which the request signal of the center device is input through the communication interface unit from the network control unit,
   wherein the sensor is one of a clamp-type alternating current sensor and a measurement device outputting a current signal as the sensor signal,
   wherein the control unit is configured to generate the sensor data by converting the current signal input from one of the clamp-type alternating current sensor and the measurement device into a voltage signal and sampling the voltage signal, and
   wherein the control unit includes a unit that sleeps when not detecting the current signal input from one of the clamp-type alternating current sensor and the measurement device and wakes up when detecting re-input of the current signal from one of the clamp-type alternating current sensor and the measurement device.

3. A sensor terminal which processes a sensor signal output from at least one sensor and transmits the sensor signal being processed to a center device through a network control unit and a communication line, comprising:
   a communication interface unit capable of being connected to the network control Unit;
   a sensor input interface unit being connected to the sensor and inputting the sensor signal; and
   a control unit generating sensor data from the sensor signal input through the sensor input interface unit and transmitting sensor data corresponding to a request signal of the center device and active sensor data to the center device through the network control unit from the communication interface unit, in which the request signal of the center device is input through the communication interface unit from the network control unit,
   wherein the control unit is configured to compare the sensor data with at least one threshold and to average the sensor data by sampling the sensor data the number of sampling times depending on a size relationship with the threshold.

4. A sensor terminal which processes a sensor signal output from at least one sensor and transmits the sensor signal being processed to a center device through a network control unit and a communication line, comprising:
   a communication interface unit capable of being connected to the network control unit;
   a sensor input interface unit being connected to the sensor and inputting the sensor signal;
   a control unit generating sensor data from the sensor signal input through the sensor input interface unit and transmitting sensor data corresponding to a request signal of the center device and active sensor data to the center device through the network control unit from the communication interface unit, in which the request signal of the center device is input through the communication interface unit from the network control unit; and
   a unit performing power feeding to each part of the sensor terminal from one of an AC adapter and a battery and performing power feeding to the network control unit.

5. A sensor terminal which processes a sensor signal output from at least one sensor and transmits the sensor signal being processed to a center device through a network control unit and a communication line, comprising:
   a communication interface unit capable of being connected to the network control unit;
   a sensor input interface unit being connected to the sensor and inputting the sensor signal;
   a control unit generating sensor data from the sensor signal input through the sensor input interface unit and transmitting sensor data corresponding to a request signal of the center device and active sensor data to the center device through the network control unit from the communication interface unit, in which the request signal of the center device is input through the communication interface unit from the network control unit; and
   a unit performing power feeding to each part of the sensor terminal from one of an AC adapter and a battery and performing power feeding to the network control unit,
   wherein the control unit is configured to detect a presence or absence of the power feeding from the AC adapter at a timing of sampling the voltage signal and to perform control of switching to the power feeding from the battery based on power failure detection indicating that there is no power feeding, and is configured to further detect a feeding voltage from the battery at the timing of sampling the voltage signal so as to compare the feeding voltage with a threshold and to transmit a notification signal to the center device through the network control unit when switched to the power feeding from the battery and when the feeding voltage from the battery is below the threshold.

6. A sensor terminal which processes a sensor signal output from at least one sensor and transmits the sensor signal being processed to a center device through a network control unit and a communication line, comprising:
   a communication interface unit capable of being connected to the network control unit;
   a sensor input interface unit being connected to the sensor and inputting the sensor signal;
   a control unit generating sensor data from the sensor signal input through the sensor input interface unit and transmitting sensor data corresponding to a request signal of the center device and active sensor data to the center device through the network control unit from the communication interface unit, in which the request signal of the center device is input through the communication interface unit from the network control unit; and
   a unit performing power feeding to each part of the sensor terminal from one of an AC adapter and a battery and performing power feeding to the network control unit,
   wherein the control unit is configured to detect a presence or absence of the power feeding from the AC adapter at a timing of sampling the voltage signal and to perform control of switching to the power feeding from the battery based on power failure detection indicating that there is no power feeding, and is configured to isolate a power failure range depending on the power failure detection and a presence or absence of the voltage signal and to transmit a notification signal to the center device through the network control unit.

7. A sensor terminal which processes a sensor signal output from at least one sensor and transmits the sensor signal being processed to a center device through a network control unit and a communication line, comprising:
   a communication interface unit capable of being connected to the network control unit;
   a sensor input interface unit being connected to the sensor and inputting the sensor signal;
   a control unit generating sensor data from the sensor signal input through the sensor input interface unit and transmitting sensor data corresponding to a request signal of the center device and active sensor data to the center device through the network control unit from the communication interface unit, in which the request signal of the center device is input through the communication interface unit from the network control unit,
   wherein the sensor is one of a clamp-type alternating current sensor and a measurement device outputting a current signal as the sensor signal; and
   the control unit is configured to generate the sensor data by converting the current signal input from one of the clamp-type alternating current sensor and the measurement device into a voltage signal and sampling the voltage signal, and further comprising
   a unit performing power feeding from a power storage unit to each part of the sensor terminal and performing power feeding to the network control unit; and
   a unit charging the power storage unit using the current signal when not generating the sensor data from the current signal input from one of the clamp-type alternating current sensor and the measurement device.

8. A sensor network system comprising:
   a sensor terminal which processes a sensor signal output from at least one sensor and transmits the sensor signal being processed to a center device through a network control unit and a communication line, comprising:
   a communication interface unit capable of being connected to the network control unit;
   a sensor input interface unit being connected to the sensor and inputting the sensor signal;
   a control unit generating sensor data from the sensor signal input through the sensor input interface unit and transmitting sensor data corresponding to a request signal of the center device and active sensor data to the center device through the network control unit from the communication interface unit, in which the request signal of the center device is input through the communication interface unit from the network control unit,
   a network control unit being connected to the sensor terminal and being connected to the center device through the communication line; and
   a center device performing a remote monitoring of the sensor by collecting the sensor data corresponding to the request signal and the sensor data actively transmitted from the sensor terminal through the network control unit, in which the request signal is transmitted to the sensor terminal through the network control unit,
   wherein:
   the sensor is one of a clamp-type alternating current sensor and a measurement device outputting a current signal as the sensor signal; and
   the control unit is configured to generate the sensor data by converting the current signal input from one of the clamp-type alternating current sensor and the measurement device into a voltage signal and sampling the voltage signal.

9. A sensor network system comprising:
   a sensor terminal which processes a sensor signal output from at least one sensor and transmits the sensor signal being processed to a center device through a network control unit and a communication line, comprising:
   a communication interface unit capable of being connected to the network control unit;
   a sensor input interface unit being connected to the sensor and inputting the sensor signal;
   a control unit generating sensor data from the sensor signal input through the sensor input interface unit and transmitting sensor data corresponding to a request signal of the center device and active sensor data to the center device through the network control unit from the communication interface unit, in which the request signal of the center device is input through the communication interface unit from the network control unit;
   a network control unit being connected to the sensor terminal and being connected to the center device through the communication line; and
   a center device performing a remote monitoring of the sensor by collecting the sensor data corresponding to the request signal and the sensor data actively transmitted from the sensor terminal through the network control unit, in which the request signal is transmitted to the sensor terminal through the network control unit, wherein:

the sensor is one of a clamp-type alternating current sensor and a measurement device outputting a current signal as the sensor signal;

the control unit is configured to generate the sensor data by converting the current signal input from one of the clamp-type alternating current sensor and the measurement device into a voltage signal and sampling the voltage signal;

the control unit includes a current/voltage conversion circuit unit that converts current signals input from a plurality of the sensors into voltage signals each having a predetermined input voltage range.

10. A sensor network system comprising:
the sensor terminal according to claim 1;
a network control unit being connected to the sensor terminal and being connected to the center device through the communication line; and
a center device performing a remote monitoring of the sensor by collecting the sensor data corresponding to the request signal and the sensor data actively transmitted from the sensor terminal through the network control unit, in which the request signal is transmitted to the sensor terminal through the network control unit.

11. A sensor network system comprising:
the sensor terminal according to claim 2;
a network control unit being connected to the sensor terminal and being connected to the center device through the communication line; and
a center device performing a remote monitoring of the sensor by collecting the sensor data corresponding to the request signal and the sensor data actively transmitted from the sensor terminal through the network control unit, in which the request signal is transmitted to the sensor terminal through the network control unit.

12. A sensor network system comprising:
the sensor terminal according to claim 3;
a network control unit being connected to the sensor terminal and being connected to the center device through the communication line; and
a center device performing a remote monitoring of the sensor by collecting the sensor data corresponding to the request signal and the sensor data actively transmitted from the sensor terminal through the network control unit, in which the request signal is transmitted to the sensor terminal through the network control unit.

13. A sensor network system comprising:
the sensor terminal according to claim 4;
a network control unit being connected to the sensor terminal and being connected to the center device through the communication line; and
a center device performing a remote monitoring of the sensor by collecting the sensor data corresponding to the request signal and the sensor data actively transmitted from the sensor terminal through the network control unit, in which the request signal is transmitted to the sensor terminal through the network control unit.

14. A sensor network system comprising:
the sensor terminal according to claim 5;
a network control unit being connected to the sensor terminal and being connected to the center device through the communication line; and
a center device performing a remote monitoring of the sensor by collecting the sensor data corresponding to the request signal and the sensor data actively transmitted from the sensor terminal through the network control unit, in which the request signal is transmitted to the sensor terminal through the network control unit.

15. A sensor network system comprising:
the sensor terminal according to claim 6;
a network control unit being connected to the sensor terminal and being connected to the center device through the communication line; and
a center device performing a remote monitoring of the sensor by collecting the sensor data corresponding to the request signal and the sensor data actively transmitted from the sensor terminal through the network control unit, in which the request signal is transmitted to the sensor terminal through the network control unit.

16. A sensor network system comprising:
the sensor terminal according to claim 7;
a network control unit being connected to the sensor terminal and being connected to the center device through the communication line; and
a center device performing a remote monitoring of the sensor by collecting the sensor data corresponding to the request signal and the sensor data actively transmitted from the sensor terminal through the network control unit, in which the request signal is transmitted to the sensor terminal through the network control unit.

17. A sensor network system comprising:
a sensor terminal which processes a sensor signal output from at least one sensor and transmits the sensor signal being processed to a center device through a network control unit and a communication line, comprising:
a communication interface unit capable of being connected to the network control unit;
a sensor input interface unit being connected to the sensor and inputting the sensor signal;
a control unit generating sensor data from the sensor signal input through the sensor input interface unit and transmitting sensor data corresponding to a request signal of the center device and active sensor data to the center device through the network control unit from the communication interface unit, in which the request signal of the center device is input through the communication interface unit from the network control unit;
the sensor is one of a clamp-type alternating current sensor and a measurement device outputting a current signal as the sensor signal; and
the control unit is configured to generate the sensor data by converting the current signal input from one of the clamp-type alternating current sensor and the measurement device into a voltage signal and sampling the voltage signal,
wherein the control unit is configured to store the sensor data generated from the sensor signal in a logical channel of a memory and to read the sensor data corresponding to the request signal of the center device from the logical channel of the memory so as to transmit the sensor data,
wherein the request signal includes an identifier for identifying the sensor terminal and a sensor channel for specifying the logical channel; and
wherein the network system further comprises:
a network control unit being connected to the sensor terminal and being connected to the center device through the communication line; and
a center device performing a remote monitoring of the sensor by collecting the sensor data corresponding to the request signal and the sensor data actively transmitted from the sensor terminal through the network control unit, in which the request signal is transmitted to the sensor terminal through the network control unit.

* * * * *